United States Patent
Greaves

(10) Patent No.: US 11,253,877 B2
(45) Date of Patent: Feb. 22, 2022

(54) OIL DISTRIBUTION ASSEMBLY

(71) Applicant: ROLLS-ROYCE plc, London (GB)

(72) Inventor: Richard Greaves, Derby (GB)

(73) Assignee: ROLLS-ROYCE plc, London (GB)

(*) Notice: Subject to any disclaimer, the term of this patent is extended or adjusted under 35 U.S.C. 154(b) by 475 days.

(21) Appl. No.: 16/353,353

(22) Filed: Mar. 14, 2019

(65) Prior Publication Data

US 2019/0299227 A1 Oct. 3, 2019

(30) Foreign Application Priority Data

Mar. 29, 2018 (GB) ..................................... 1805180

(51) Int. Cl.
| | |
|---|---|
| *B05B 3/10* | (2006.01) |
| *F01D 25/18* | (2006.01) |
| *F16C 33/66* | (2006.01) |

(52) U.S. Cl.
CPC ............ *B05B 3/1021* (2013.01); *F01D 25/18* (2013.01); *F16C 33/6659* (2013.01); *F16C 33/6677* (2013.01); *F05D 2260/98* (2013.01)

(58) Field of Classification Search
CPC .. F16C 33/66; F16C 33/6659; F16C 33/6677; F01D 25/18; F01D 2260/98; F05D 2260/98; B05B 3/1021
See application file for complete search history.

(56) References Cited

U.S. PATENT DOCUMENTS 4,342,489 A * 8/1982 Lenz .................. F16C 33/6659
  184/6.11
4,502,274 A * 3/1985 Girault .................... F01D 25/18
  184/6.11

(Continued)

FOREIGN PATENT DOCUMENTS

| EP | 2362080 | 8/2011 |
|---|---|---|
| EP | 3 299 585 A1 | 3/2018 |

(Continued)

OTHER PUBLICATIONS

Great Britain search report dated Sep. 19, 2018, issued in GB Patent Application No. 1805180.5.

(Continued)

*Primary Examiner* — Michael R Mansen
*Assistant Examiner* — Mark K Buse
(74) *Attorney, Agent, or Firm* — Crowell & Moring LLP

(57) ABSTRACT

The present disclosure concerns an oil distribution assembly for a system having rotating components requiring a supply of oil, such as bearing components of a gas turbine engine. Example embodiments include an oil distribution assembly for a gas turbine engine, comprising: an oil distributor mounted for rotation about a rotation axis of the assembly and comprising an internal volume having a plurality of channels extending along an inner radial surface of the oil distributor; and an oil injector arranged to direct a supply of oil to the plurality of channels in a direction having a component in a first direction along the rotation axis; wherein each of the plurality of channels is angled relative to the rotation axis such that a radial distance between each channel and the rotation axis increases along the rotation axis.

19 Claims, 3 Drawing Sheets

(56) References Cited

U.S. PATENT DOCUMENTS

| | | | | |
|---|---|---|---|---|
| 4,759,427 A | * | 7/1988 | Onose | F16C 33/6662 |
| | | | | 184/39.1 |
| 5,593,165 A | * | 1/1997 | Murray | F01D 11/003 |
| | | | | 277/543 |
| 8,464,835 B2 | * | 6/2013 | Munson | F01D 25/18 |
| | | | | 184/6.11 |
| 2013/0004109 A1 | * | 1/2013 | Metzger | F16C 33/583 |
| | | | | 384/473 |
| 2018/0087404 A1 | * | 3/2018 | Lighty | F01D 11/003 |
| 2019/0120085 A1 | * | 4/2019 | Walker | F16C 33/66 |

FOREIGN PATENT DOCUMENTS

| | | |
|---|---|---|
| FR | 2932221 | 12/2009 |
| GB | 2140877 | 12/1984 |
| WO | 2014165138 | 10/2014 |

OTHER PUBLICATIONS

Extended European Search Report, issued in EP Application No. 19161476.7, dated Aug. 12, 2019, pp. 1-7, European Patent Office, Munich, Germany.

\* cited by examiner

OIL DISTRIBUTION ASSEMBLY

CROSS-REFERENCE TO RELATED APPLICATIONS

This application is based upon and claims the benefit of priority from British Patent Application Number 1805180.5 filed 29 Mar. 2018, the entire contents of which are herein incorporated by reference.

BACKGROUND

Technical Field

The present disclosure concerns an oil distribution assembly for a system having rotating components requiring a supply of oil, such as bearing components of a gas turbine engine.

Description of the Related Art

Oil distributors are commonly used within aerospace transmission systems to transport oil from one or more oil injectors (also known as oil injection jets) through a rotating component to lubricate and cool components such as bearings, splines, gears and seals. Such oil distributers use centripetal force to retain oil on an internal rotating surface of the distributor. Structures such as slots, pockets and scallops may be used to achieve a particular desired flow and distribution of oil. The structures may determine the quantity of oil for each component, as well as the annular distribution and axial position of oil required to reach each component.

A typical oil distributor design employing scallops to direct a flow of oil will tend to have the same radius maintained along the full length of each scallop. This permits an even distribution of oil along the length of each scallop. However, some applications may have significant space constraints or high rotational speeds, which require close proximity of oil jet targeting to prevent deflection of the oil jet away from its target. In such cases, such close proximity of an oil jet to an oil feed point can result in the oil flow being disrupted, which may prevent the correct quantity and distribution of oil within the distributor from reaching the desired targets.

SUMMARY

According to a first aspect there is provided an oil distribution assembly for a gas turbine engine, comprising:

an oil distributor mounted for rotation about a rotation axis of the assembly and comprising an internal volume having a plurality of channels extending along an inner radial surface of the oil distributor; and an oil injector arranged to direct a supply of oil to the plurality of channels in a direction having a component in a first direction along the rotation axis;

wherein each of the plurality of channels is angled relative to the rotation axis such that a radial distance between each channel and the rotation axis increases along the rotation axis.

By angling the channels relative to the rotation axis, the flow of oil through each channel can be directed to take into account the flow of oil from the oil injector, for example by angling a channel away from the oil injector if the flow of oil along the channel could be disrupted by flow from the injector.

In some embodiments the radial distance between each channel and the rotation axis increases in a second direction opposite to the first direction along the rotation axis. Angling the channels in this way can be used to counteract the flow of oil from an injector to allow for oil to flow along the channel despite a counteracting flow from the injector.

In some embodiments the oil injector may be disposed within the internal volume of the oil distributor. In other embodiments the oil injector may be outside of the internal volume of the oil distributor, for example directing a flow of oil into the oil distributor.

In some embodiments each of the plurality of channels may extend in a direction parallel to the rotation axis. In other embodiments the channels may be angled relative to the rotation axis, for example extending in a helical direction around the axis.

The oil distribution assembly may comprise a plurality of oil feed holes each passing through a wall of the oil distributor between a respective one of the plurality of channels and an outer radial surface of the oil distributor. Each hole allows a flow of oil to be provided at a specific point around the outer radial surface of the oil distributor.

The oil distributor may be arranged to rotate around the oil injector, i.e. the oil distributor rotates relative to a static oil injector. In other embodiments the oil injector may also be rotatable.

The oil distributor may be configured to direct a supply of oil to each of the plurality of channels in turn as the oil distributor rotates relative to the oil injector.

The oil distributor may be incorporated into a gas turbine engine, in which one or more of the rotatably mounted components of the engine may be provided with an oil distributor of the type described herein.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
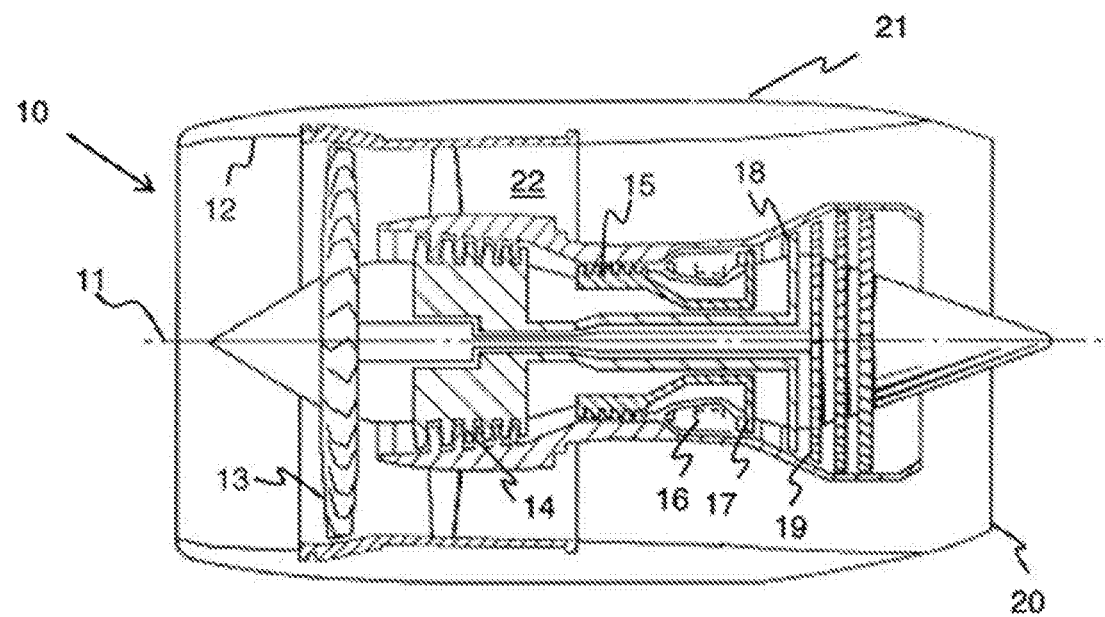
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive, the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example, such engines may have an alternative number of interconnecting shafts (e.g. two) and/or an alternative number of compressors and/or turbines. The engine may comprise a gearbox provided in the drive train from a turbine to a compressor and/or fan.

Figure 2:
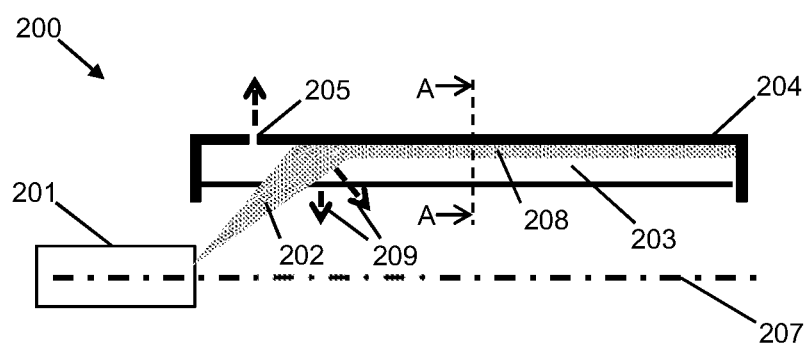
FIG. 2 is a schematic partial longitudinal sectional view of an example oil distribution assembly.

FIG. 2 is a schematic representation of portion of an example oil distribution assembly 200, in which an oil injector 201 directs a jet 202 of oil towards a channel 203 in an inner radial surface of an oil distributor 204. A flow of oil is created by rotation of the oil distributor 204 relative to the injector 201, which keeps oil flowing along the surface of the channel 203 as the oil distributor 204 rotates about the rotational axis 207. A hole 205 through the wall of the distributor 204 provides a passage for oil to escape from the channel 203 and be directed to provide an oil supply to a particular component.

Figure 3:
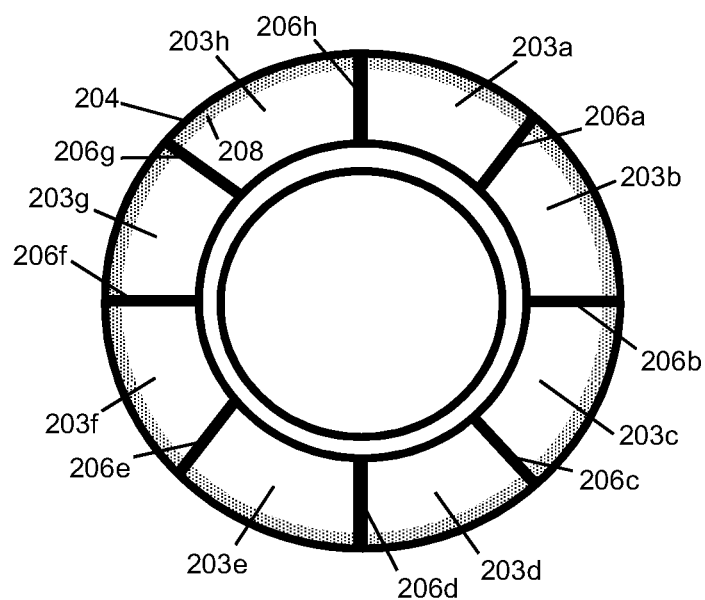
FIG. 3 is a schematic axial sectional view of the oil distributor of the assembly shown in FIG. 2.

FIG. 3 is a schematic axial cross-sectional view through the oil distributor 204, taken along the section A-A shown in FIG. 2. Multiple channels 203a-h are provided on an inner radial surface of the oil distributor 204, each channel directing a flow of oil towards a part of the distributor 204. Dividing walls 206a-h separate the channels 203a-h from each other so that oil 208 flows along the channels in a direction generally parallel to the rotation axis 207 (FIG. 2) of the oil distributor 204.

A problem with the arrangement in FIGS. 2 and 3 is that the direction and force of oil flow from the injector 201 can prevent at least a proportion of oil reaching the hole 205 due to the force of oil flow against the direction of flow required along the channel 203. This can cause some oil to flow in directions away from the hole 205, indicated by arrows 209, and may result in oil being lost to adjacent channels 203a-h by flowing over an adjoining wall 206a-h. This can result in a component requiring a flow of oil from the hole 205 receiving less than required or, in certain situations, no oil at all. To address these problems, each channel may be inclined relative to the rotational axis of the oil distributor. The incline may be positive or negative, i.e. inclined with or against the flow of oil from the injector. An example of a positive incline is illustrated in FIG. 4, and a negative incline in FIG. 5.

Figure 4:
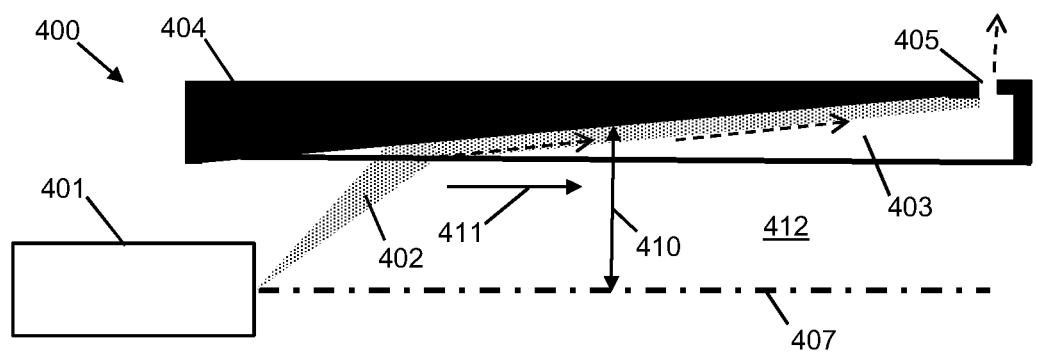
FIG. 4 is a schematic partial longitudinal sectional view of an alternative example oil distribution assembly.

Referring to FIG. 4, the oil injector assembly 400 comprises an oil distributor 404 mounted for rotation about a rotation axis 407 of the assembly 400 and comprising an internal volume 412 having a plurality of channels 403 extending along an inner radial surface of the oil distributor. Each channel 403 is inclined relative to the rotational axis 407 such that a radial distance 410 between the channel 403 and the rotational axis 407 increases in a direction 411 along the rotational axis 407 that is the same direction as a component of the direction of oil jet 402 from the injector 401 along the rotational axis 407. The increase in radial distance 410 may be linear along the length of the channel 403, i.e. with a constant gradient relative to the rotational axis 407. In alternative embodiments the gradient of the channel 403 may vary along its length, for example becoming greater or smaller in the direction 411 along the rotational axis 407.

In the example in FIG. 4, the oil jet 402 provided by the injector 401 is in a direction having a component parallel to the rotational axis 407 in which the radial distance 410 increases along the length of the channel 403. The result is that the oil jet 402 does not interfere with the flow of oil along the channel 403 towards the hole 405 provided at the end of the channel 403. In other cases, the hole may need to be provided towards the other end of the channel, for example as a result of space constraints. In such cases the gradient of the channel may alter to that in the example shown in FIG. 5. In the oil distribution assembly 500 of FIG. 5, the oil jet 502 issued by the injector 501 is directed away from the hole 505 through which the oil is required to flow after passing along the channel 503. In this embodiment, the channel 503 is inclined relative to the rotational axis 507 such that the radial distance 510 between the channel 503 and the rotation axis 507 increases in a direction 511 along the rotation axis 507 that is opposite to the component along the rotational axis 507 of the direction of oil flow emitted by the injector 501. This negative incline results in the centripetal force on the oil within the channel 503 tending to cause the oil to flow more readily towards the hole 505, even against the force of oil directed towards the channel by the injector 501. The negative incline therefore enhances the flow of oil towards the hole 505 relative to that for a zero incline.

Figure 5:
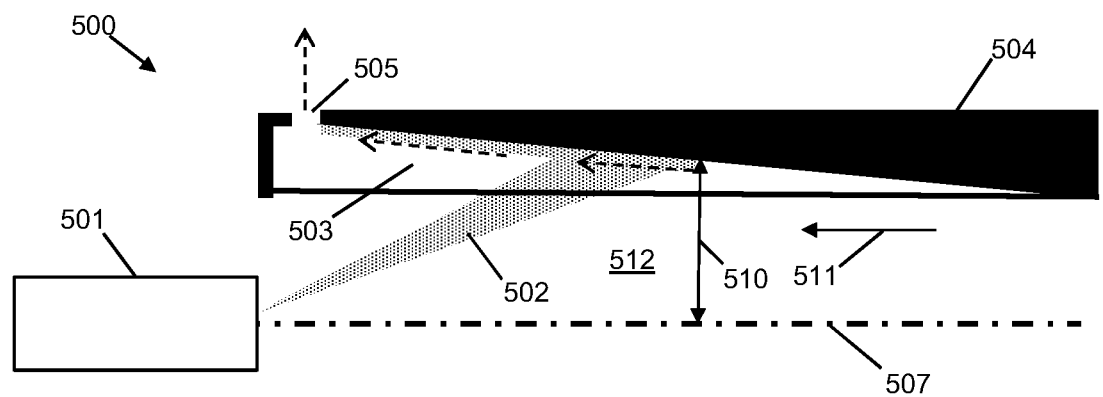
FIG. 5 is a schematic partial longitudinal sectional view of a further alternative example oil distribution assembly.

As with the example in FIG. 4, the increase in radial distance 510 for the channel 503 in FIG. 5 may be linear along the length of the channel 503, i.e. with a constant gradient relative to the rotational axis 507. In alternative embodiments the gradient of the channel 503 may vary along its length, for example becoming greater or smaller in the direction 511 along the rotational axis 507.

In the examples of FIGS. 4 and 5, the gradient (whether positive or negative), which may be defined by an angle to the rotational axis, may be between 1 and 15 degrees, and optionally between 5 and 10 degrees. The gradient may be constant along the length of the channel or may vary in various ways, such as with a positive or negative curvature, depending on the requirements of oil flow along the channel.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

I claim:

1. An oil distribution assembly for a gas turbine engine, comprising:
    an oil distributor mounted for rotation about a rotation axis of the assembly and comprising an internal volume having a plurality of channels extending along an inner radial surface of the oil distributor, each channel of the plurality of channels having an outer radial surface; and an oil injector arranged to direct a supply of oil to the plurality of channels in a direction having a component in a first direction along the rotation axis;

wherein the outer radial surface of each of the plurality of channels is angled relative to the rotation axis such that a radial distance between the outer radial surface of each channel and the rotation axis increases along the rotation axis.

2. The oil distribution assembly of claim 1, wherein the radial distance between the outer radial surface of each channel and the rotation axis increases in the first direction along the rotation axis.

3. The oil distribution assembly of claim 1, wherein the radial distance between the outer radial surface of each channel and the rotation axis increases in a second direction opposite to the first direction along the rotation axis.

4. The oil distribution assembly of claim 1, wherein the oil injector is disposed within the internal volume of the oil distributor.

5. The oil distribution assembly of claim 1, wherein each of the plurality of channels extends in a direction parallel to the rotation axis.

6. The oil distribution assembly of claim 1, comprising a plurality of oil feed holes each passing through a wall of the oil distributor between a respective one of the plurality of channels and an outer radial surface of the oil distributor.

7. The oil distribution assembly of claim 1, wherein the oil distributor is arranged to rotate around the oil injector.

8. The oil distribution assembly of claim 7, wherein the oil distributor is configured to direct a supply of oil to each of the plurality of channels in turn as the oil distributor rotates relative to the oil injector.

9. A gas turbine engine comprising components rotatably connected about a rotational axis of the engine, one or more of the components comprising an oil distribution assembly according to claim 1.

10. An oil distribution assembly for a gas turbine engine, comprising:
    an oil distributor mounted for rotation about a rotation axis of the assembly and comprising an internal volume having a plurality of channels extending along an inner radial surface of the oil distributor; and
    an oil injector arranged to direct a supply of oil to the plurality of channels in a direction having a component in a first direction along the rotation axis;
    wherein each of the plurality of channels is angled relative to the rotation axis such that a radial distance between each channel and the rotation axis increases along the rotation axis; and
    wherein the oil injector is disposed within the internal volume of the oil distributor.

11. The oil distribution assembly of claim 10, wherein the radial distance between each channel and the rotation axis increases in the first direction along the rotation axis.

12. The oil distribution assembly of claim 10, wherein the radial distance between each channel and the rotation axis increases in a second direction opposite to the first direction along the rotation axis.

13. The oil distribution assembly of claim 10, wherein a channel of the plurality of channels has an outer radial surface, and wherein the outer radial surface of that channel is angled relative to the rotation axis such that a radial distance between the outer radial surface of that channel and the rotation axis increases along the rotation axis.

14. A gas turbine engine comprising components rotatably connected about a rotational axis of the engine, one or more of the components comprising an oil distribution assembly according to claim 10.

15. An oil distribution assembly for a gas turbine engine, comprising:
    an oil distributor mounted for rotation about a rotation axis of the assembly and comprising an internal volume having a plurality of channels extending along an inner radial surface of the oil distributor; and
    an oil injector arranged to direct a supply of oil to the plurality of channels in a direction having a component in a first direction along the rotation axis;
    a plurality of oil feed holes each passing through a wall of the oil distributor between a respective one of the plurality of channels and an outer radial surface of the oil distributor;
    wherein each of the plurality of channels is angled relative to the rotation axis such that a radial distance between each channel and the rotation axis increases along the rotation axis.

16. The oil distribution assembly of claim 15, wherein the radial distance between each channel and the rotation axis increases in the first direction along the rotation axis.

17. The oil distribution assembly of claim 15, wherein the radial distance between each channel and the rotation axis increases in a second direction opposite to the first direction along the rotation axis.

18. The oil distribution assembly of claim 15, wherein a channel of the plurality of channels has an outer radial surface, and wherein the outer radial surface of that channel is angled relative to the rotation axis such that a radial distance between the outer radial surface of that channel and the rotation axis increases along the rotation axis.

19. A gas turbine engine comprising components rotatably connected about a rotational axis of the engine, one or more of the components comprising an oil distribution assembly according to claim 15.

\* \* \* \* \*